United States Patent
Ranjan et al.

(10) Patent No.: US 9,292,753 B2
(45) Date of Patent: Mar. 22, 2016

(54) PARALLEL FACE DETECTION AND TRACKING SYSTEM

(71) Applicant: Intel Corporation, Santa Clara, CA (US)

(72) Inventors: Abhishek Ranjan, Markham (CA); Shahzad A. Malik, Markham (CA); Phillipp J. Hubert, Markham (CA); Umeshbhai Patel, Markham (CA); Faizal N. Javer, Markham (CA); Haroon F. Mirza, Markham (CA); William J. Colson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/682,930

(22) Filed: Nov. 21, 2012

(65) Prior Publication Data

US 2014/0140572 A1    May 22, 2014

(51) Int. Cl.
*G06K 9/00* (2006.01)

(52) U.S. Cl.
CPC ........ *G06K 9/00993* (2013.01); *G06K 9/00261* (2013.01)

(58) Field of Classification Search
None
See application file for complete search history.

(56) References Cited

U.S. PATENT DOCUMENTS

| | | | |
|---|---|---|---|
| 2005/0068571 A1* | 3/2005 | Hart et al. | 358/1.15 |
| 2009/0324085 A1* | 12/2009 | Leung et al. | 382/190 |
| 2011/0034176 A1* | 2/2011 | Lord et al. | 455/450 |
| 2011/0098056 A1* | 4/2011 | Rhoads et al. | 455/456.1 |
| 2011/0212761 A1* | 9/2011 | Paulsen et al. | 463/25 |

* cited by examiner

*Primary Examiner* — Weiwen Yang
(74) *Attorney, Agent, or Firm* — Grossman, Tucker, Perreault & Pfleger, PLLC

(57) ABSTRACT

The present disclosure is directed to a parallel face detection and tracking system. In general, embodiments consistent with the present disclosure may be configured to distribute the processing load associated with the detection and tracking of different faces in an image between multiple data processors. If needed, processing load balancing and/or protective features may be implemented to prevent the data processors from becoming overwhelmed. In one embodiment, a device may comprise, for example, a communication module and at least one processing module. The communication module may be configured to receive at least image information that may be processed by a plurality of data processors in the data processing module. For example, each of the data processors may be configured to detect faces in the image information and/or track detected faces in the image information based on at least one criterion.

21 Claims, 4 Drawing Sheets

PARALLEL FACE DETECTION AND TRACKING SYSTEM

FIELD

This disclosure relates to face detection and tracking, and more particularly, to a system for distributing processing for face detection and tracking to a plurality of processing entities.

BACKGROUND

With security being an important area of concern globally, recently an emphasis has been placed on technologies that may help to detect threats, to identify parties involved in an incident, etc. For example, governmental facilities, educational facilities, overnight lodging facilities (e.g. hotels, resorts, etc.), commercial facilities, etc. may employ electronic surveillance for protecting public servants, employees, students, guests, merchandise (e.g., from shoplifters), etc. At least one technology that may enhance electronic surveillance is image processing for detecting and tracking faces. Face detection technologies may be able to identify faces within an image (e.g., a single frame of video). Detected faces may then be tracked from image to image to determine a path of movement through a facility. While processing images in this manner may be somewhat straightforward for detecting and tracking one face, existing face detection and tracking systems may become quickly overwhelmed when attempting to process video of a large crowd of people, wherein each face in a large number of faces must be identified and tracked from frame to frame.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
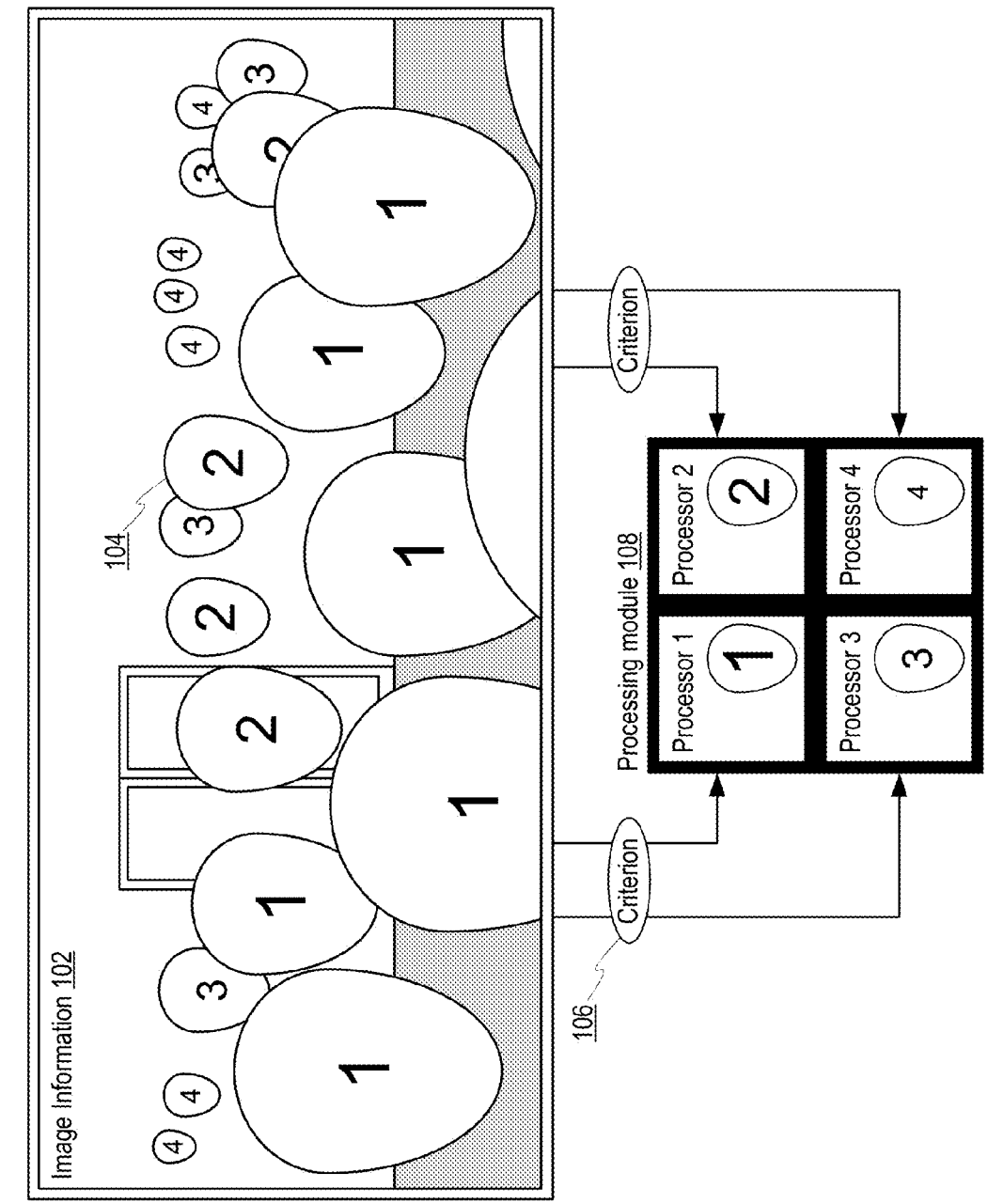
FIG. 1 illustrates an example parallel face detection and tracking system in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is generally directed to a parallel face detection and tracking system. In general, embodiments consistent with the present disclosure may be configured to distribute the processing load associated with the detection and tracking of different faces in an image between multiple data processors. If needed, processing load balancing and/or protective features may be implemented to prevent the data processors from becoming overwhelmed. In one embodiment, a device may comprise, for example, a communication module and at least one processing module. The communication module may be configured to receive at least image information that may be processed by a plurality of data processors in the data processing module. For example, each of the data processors may be configured to detect faces in the image information and/or track detected faces in the image information based on at least one criterion.

The image information may be, for example a frame of video received from an image capture device (e.g., a camera). The processing of the image information may generate results information that is stored in a memory module also in the device. The results information may include, for example, at least detected face size and the location of each detected face within a frame. In one embodiment, protections may be implemented to prevent data processors from becoming exhausted. For example, a determination may be made as to whether detecting faces in a currently received frame would cause a data processor to exceed a certain threshold (e.g., would cause available processing resources to be exhausted in the data processor). If it is determined that detecting faces in the currently received frame may cause the data processor to exceed the threshold, then further face detection (e.g., any face detection that could cause the data processor to exceed the certain threshold) may be delayed until a later received frame. In the same or a different embodiment, the device may also include a face detection and tracking allocation module configured to balance a face detection and tracking workload between the plurality of data processors based on the at least one criterion.

In one embodiment, the at least one criterion may be based on a detected face size scale. Detected face size scale may refer to, for example, a size of a detected face in an image relative to the size of other faces detected the same image. Depending on the type of face detection and tracking algorithm employed, face size scale may correspond to the amount of processing needed to detect and/or track the face within an image, and thus, face size scale may be used to balance the face detection and tracking load between the plurality of data processors. In the same or a different embodiment, the processing module may actually be a microprocessor, wherein the plurality of data processors may correspond to processing cores within the microprocessor.

FIG. 1 illustrates example parallel face detection and tracking system 100 in accordance with at least one embodiment of the present disclosure. In general, image information 102 may be processed by data processors 1-4 in processing module 108 based on criteria 106. While only four data processors are shown in FIG. 1, this configuration is merely for the sake of explanation, and is not intended to limit embodiments consistent with the present disclosure to use with only four data processors. The number of data processors in processing module 108 may depend on, for example, the type of equipment employed in system 100. Example image information 102 may comprise still images such as photographs or videos including moving images comprising a plurality of frames. Image information 102 may be generated by an image capture device such as, for example, a camera. Example implementations consistent with the present disclosure may include one or more cameras configured to capture images in an environment where security is a concern. For example, a closed-circuit surveillance system may be configured to capture images of people that visit government offices, schools, banks, stores, stadiums, arenas, hotels, resorts, apartments, that use public transportation or in any other instance where the tracking of people may be useful to prevent crime or to determine parties to an incident that has already occurred.

As image information 102 may record the comings and goings of people, it may comprise one or more faces 104. Faces 104 in image information 102 have been presented from a single-viewpoint perspective (e.g., from the perspective of an image capture device like a camera). As a result, while the actual dimensions of faces 104 may be similar, the apparent size of faces 104 may differ significantly depending on their range from the camera. Faces 104 that are closer up to a camera may appear to be much larger than faces 104 situated further away. The difference in appearance may be used to create different scales or ranges of scales in to which faces 104 may be divided, and these scales may serve as at least one criterion 106 usable for assigning face detection and tracking responsibility in processing module 108. For example, largest faces 104, which may also be closest to the camera, may be assigned to data processor 1, slightly smaller, and thus further away, faces 104 may be assigned to data processor 2, still smaller and further away faces 104 may be assigned to data processor 3, and smallest faces 104 (furthest away) may be assigned to data processor 4.

In assigning a scale or ranges of scales to data processors 1-4, each data processor may be configured to at least one of detect faces 104 in image information 102 based on the assigned scale or scales or to track detected faces 104 in image information 102 based on the assigned scale or scales. While in one embodiment the at least one criterion 106 used for face detection and tracking may be the same, it is also possible that face detection and face tracking may be based on different criterion 106, resulting in a data processor detecting and tracking different faces 104 (e.g., where the amount of processing needed for face detection is size dependent but the tracking of already detected faces is not size dependent). Moreover, it may be possible for certain data processors to only detect faces 104 while other data processors may only track faces 104 depending on, for example, the configuration of system 100, the processing load of system 100, etc. It is also important to note that, while face size scale is a convenient criterion 106 to explain various embodiments consistent with the present disclosure, face size scale is merely an example of a possible criterion. Other criterion may be employed in a manner similar to face size scale to control assignment of face detection and tracking processing between multiple data processors based on, for example, the type of face detection and tracking algorithms being employed. Examples of other criterion 106 may include skin color, regional proximity wherein all faces 104 in a particular region are detected and tracked by a particular data processor, etc.

Figure 2:
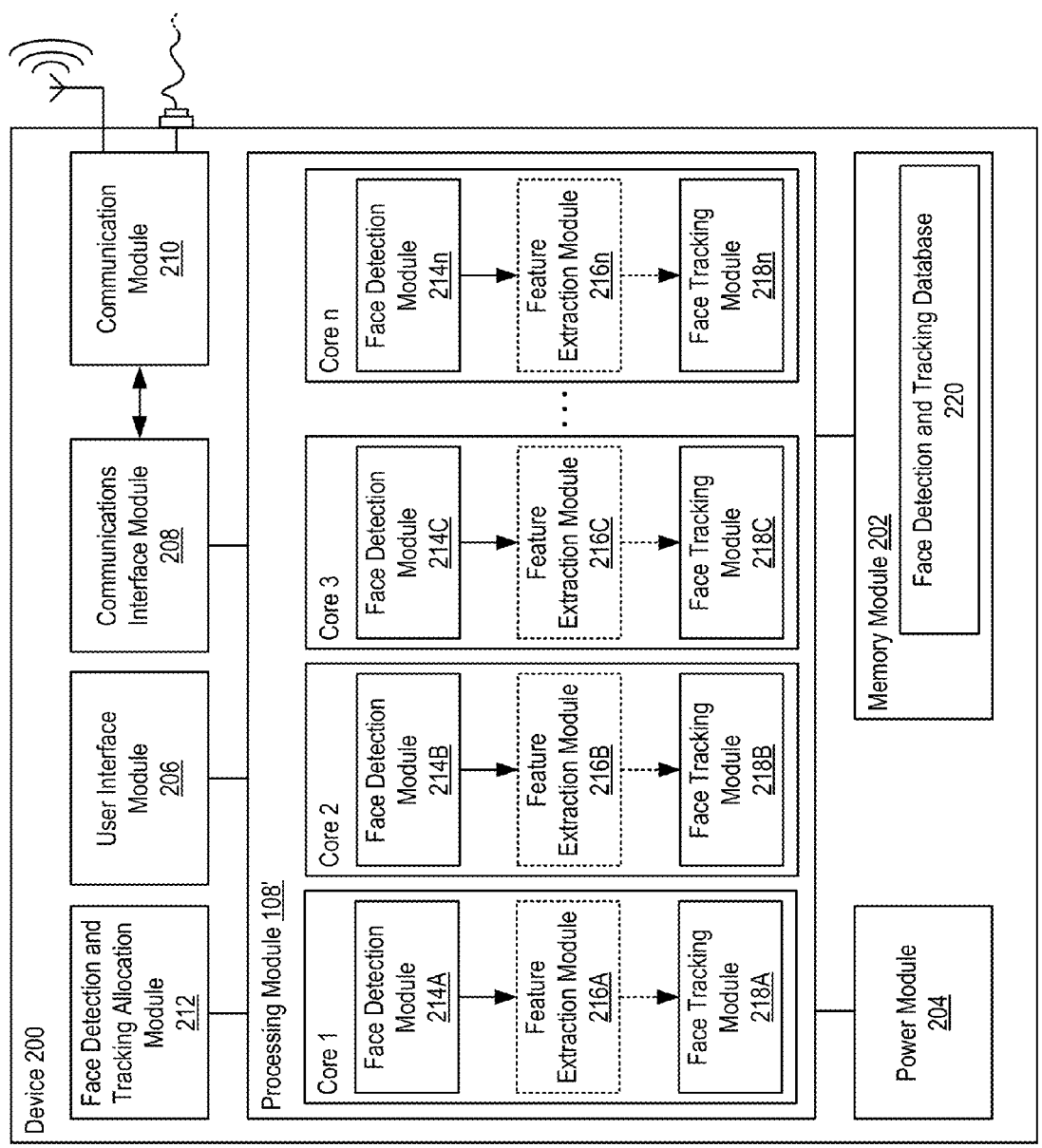
FIG. 2 illustrates an example device usable in accordance with at least one embodiment of the present disclosure.

FIG. 2 illustrates example device 200 usable in accordance with at least one embodiment of the present disclosure. Device 200 may be configured to at least receive image information 102, to process image information 102 (e.g., perform face detection and/or face tracking on image information 102) and to store results information resulting from the processing of image information 102. Examples of device 200 may include tablet computers, laptop computers, desktop computers, servers, etc. Device 200 may comprise, for example, processing module 108', memory module 202, power module 204, user interface module 206 and communication interface module 208, which may be configured to interact with communication module 210. In one embodiment, device 200 may further comprise face detection and tracking allocation module (FDTAM) 212.

In device 200, processing module 108' may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom and Core i-series product families. Examples of support circuitry may include chipsets (e.g., Northbridge, Southbridge, etc. available from the Intel Corporation) configured to provide an interface through which processing module 108' may interact with other system components that may be operating at different speeds, on different buses, etc. in device 200. Some or all of the functionality commonly associated with the support circuitry may also be included in the same physical package as the processor (e.g., an SOC package like the Sandy Bridge integrated circuit available from the Intel Corporation). In one embodiment, processing module 204 may be equipped with virtualization technology (e.g., VT-x technology available in some processors and chipsets available from the Intel Corporation) allowing for the execution of multiple virtual machines (VM) on a single hardware platform. For example, VT-x technology may also incorporate trusted execution technology (TXT) configured to reinforce software-based protection with a hardware-enforced measured launch environment (MLE).

Processing module 108' may be configured to execute instructions in device 200. Instructions may include program code configured to cause processing module 108' to perform activities related to reading data, writing data, processing data, formulating data, converting data, transforming data, etc. Information (e.g., instructions, data, etc.) may be stored in memory module 202. Memory module 202 may comprise random access memory (RAM) or read-only memory (ROM) in a fixed or removable format. RAM may include memory configured to hold information during the operation of device 200 such as, for example, static RAM (SRAM) or Dynamic RAM (DRAM). ROM may include memories such as bios memory configured to provide instructions when device 200 activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 204 may include internal power sources (e.g., a battery) and/or external power sources (e.g., electromechanical or solar generator, power grid, etc.), and related circuitry configured to supply device 200 with the power needed to operate.

User interface module 206 may include circuitry configured to allow users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 208 may be configured to handle packet routing and other control functions for communication module 210, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 208 may be configured to prevent wireless communications that are active in communication module 210 from interfering with each other. In performing this function, communication interface module 208 may schedule activities for communication module 210 based on, for example, the relative priority of messages awaiting transmission.

In the example embodiment disclosed in FIG. 2, processing module 108' may comprise a plurality of processing cores 1 . . . n (e.g., corresponding to the data processors shown in FIG. 1). As previously discussed, the number of cores in processing module 108' is not limited, and may depend on the particular equipment being employed, the size of the face detection and tracking application, etc. Each core 1 . . . n may comprise at least face detection module 214A . . . n and face tracking module 218A . . . n. Each core 1 . . . n may optionally include feature extraction module 216A . . . n depending on, for example, the face detection algorithm being employed, the type of results information required from face detection, etc. Face detection module 214A . . . n may be configured to identify a face 104 and/or facial region within image information 102. For example, face detection modules 214A . . . n may include custom, proprietary, known and/or after-developed face recognition code (or instruction sets), hardware, and/or firmware that are generally well-defined and operable to receive a standard format image (e.g., but not limited to, a RGB color image) and to identify, at least to a certain extent, faces 104 within the image. Face tracking modules 218A . . . n may be configured to track detected faces 104 through a series of images (e.g., video frames at 24 frames per second). Known face detection and tracking algorithms that may be employed by face detection modules 214A . . . n or face tracking modules 218A . . . n may include, but are not limited to, particle filtering, mean shift, Kalman filtering, Viola-Jones object detection, etc. These example face detection algorithms may utilize, for example, edge analysis, sum-of-square-difference analysis, feature point analysis, histogram analysis, skin tone analysis, etc. to identify and track faces 104 within image information 102. Feature extraction modules 214A . . . n may be configured to determine facial features within detected faces 104, and may include custom, proprietary, known and/or after-developed facial characteristics recognition code (or instruction sets) that are generally well-defined and operable to receive a standard format image (e.g., but not limited to a RGB color image) and to identify, at least to a certain extent, one or more facial characteristics in a detected face 104. Such known facial characteristics systems include, but are not limited to, the CSU Face Identification Evaluation System by Colorado State University.

In one embodiment, FDTAM 212 may be configured to use at least one criterion 106 to assign face detection and tracking processing to cores 1 . . . n. For example, FDTAM 212 may be configured to establish face size scales (or ranges of face size scales) in each of cores 1 . . . n. The number of available face size scales may initially be determined based on the following equation:

$$\text{Number of face size scales} = \log\left(\frac{\text{maximum face size}}{\text{minimum face size}}\right) \Big/ \log(\text{face size increment}) \quad (1)$$

Assuming a linear distribution, the number of scales a core may receive may then be the number of face size scales divided by the number of cores. However, it is also possible for the cores to be distributed in a non-linear manner. For example, if face detection and/or tracking is scale dependent (e.g., detecting and/or tracking smaller-scale faces 104 require more processing than larger-scale faces 104, or vice-versa, based on the particular algorithms being employed), then cores assigned to detect more processing-intensive scales may be allocated a smaller range of scales than cores assigned to detect and/or track scales requiring less processing. FDTAM 212 may be configured to allocate face size scales to cores 1 . . . n when device 200 is activated or when face detection and/or tracking is activated in device 200. In one embodiment, FDTAM 212 may also be configured to monitor the performance of cores 1 . . . n (e.g., via feedback information provided by cores 1 . . . n) and to maintain performance by dynamically reallocating face size scales. In the same or a different embodiment, FDTAM 212 may also be configured to set certain thresholds in cores 1 . . . n. A threshold may be, for example, an amount of core usage (e.g., percent utilization) at which cores 1 . . . n may be configured to take action to prevent a core from being overwhelmed (e.g., impacting overall system performance). For example, if a core in cores 1 . . . n attempts face detection on a video frame received in device 200, and performing face detection would cause the threshold to be exceeded, then the core may delay further face detection (e.g., any face detection that could cause the core to exceed the certain threshold) to a later received video frame to ensure performance does not drop with respect to tracking already detected faces 104.

Figure 3:
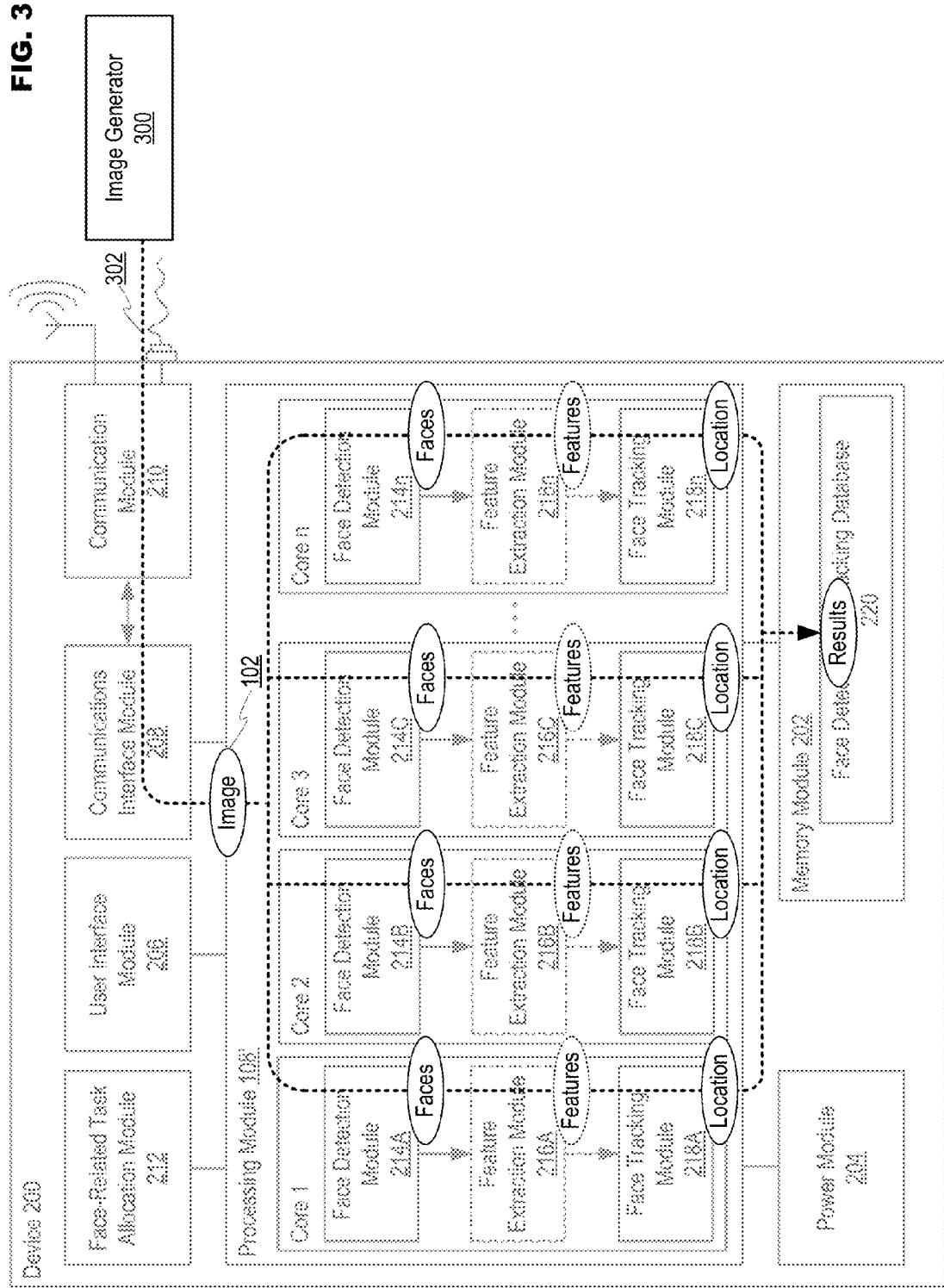
FIG. 3 illustrates an example of information flow in a device in accordance with at least one embodiment of the present disclosure.

In one embodiment, memory module 202 may also comprise face detection and tracking database (FDTD) 220. FDTD may be configured to store results information produced by cores 1 . . . n. FIG. 3 illustrates an example of information flow in device 200 in accordance with at least one embodiment of the present disclosure. Image generator 300 may comprise any device configured to capture digital images representative of an environment that includes one or more persons, and may have adequate resolution for face analysis of the one or more persons in the environment as described herein. For example, image generator 300 may include a still camera (e.g., a camera configured to capture still photographs) or a video camera (e.g., a camera configured to capture a plurality of moving images in a plurality of frames). Image generator 300 may be configured to operate with visible spectrum light or with light of other portions of the electromagnetic spectrum not limited to, the infrared spectrum, ultraviolet spectrum, etc.

Information flow 302 demonstrates how information may flow from image generator 300 to FDTD 220. In one embodiment, device 200 may be configured to receive image information 102 from image generator 300 via communication module 210. Image information 102 may be received via wired or wireless communication and may comprise a single image or video content comprising a plurality of images (e.g., to be processed on an image-by-image basis). Cores 1 . . . n may be configured to receive image information 102, to detect faces 104 in image information 102 using face detection modules 214A . . . n, to optionally (e.g., if necessary) extract features from detected faces 104 using feature extraction modules 216A . . . n, and to track detected faces 104 using face tracking modules 218A . . . n. Results information generated by each of cores 1 . . . n may then be stored in FDTD 220. In one embodiment, results information may include at least a size of each detected face 104, a time of detection for each detected face 104, and the location of each detected face 104 within image information 102. The size of each detected face 104 may be approximated, for example, by fitting a rectangle to the outside of each detected face 104 and recording the size of the rectangle. In some instances, facial features corresponding to each of the detected faces 104 may also be saved to FDTD 220 for use in, for example, identifying detected faces 104 against a database of known visitors to the environment being monitored, against a database of known criminals, etc.

Figure 4:
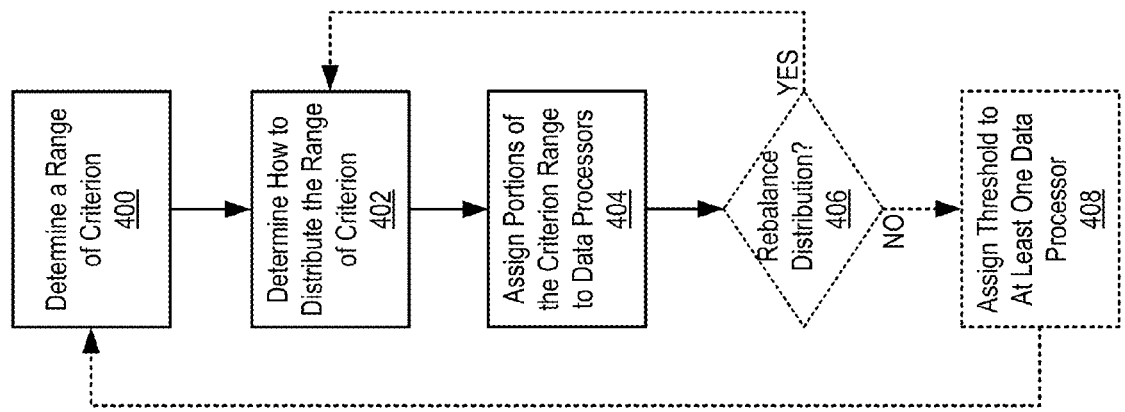
FIG. 4 illustrates a flowchart of example operations for a parallel face detection and tracking system in accordance with at least one embodiment of the present disclosure.

FIG. 4 illustrates a flowchart of example operations for a parallel face detection and tracking system in accordance with at least one embodiment of the present disclosure. The example operations disclosed in FIG. 4 may be from the perspective of a face detection and tracking allocation module. In operation 400, a range of criterion may be determined. For example, given a particular criterion (e.g., detected face scale size) a minimum of the criterion, a maximum of the criterion and an increment of the criterion may be used to determine the range. In operation 402 it may then be determined how to distribute portions of the range to different data processors in a plurality of data processors. The portions of the range distributed to each data processor in the plurality of data processors may control how face detection and/or tracking will be performed in the data processor (e.g., if based on detected face scale size, data processors will detect and/or track faces based on the face scales sizes contained in the assigned range). In one example embodiment the portion of the range of criterion assigned to the plurality of data processors may be linear, wherein each data processor receives an equal part of the range. In another embodiment, the portion of the range of criterion assigned to the plurality of data processors may be based on balancing processing load between the data processors. After the distribution is determined in operation 402, the portions of the range of the criterion may then be assigned to the plurality of data processors in operation 404. In one embodiment, only data processors that are available in the plurality of data processors (e.g., data processors that have available processing capacity to detect and/or track faces in image information) may be assigned portions of the range of criterion. In another embodiment, more than one criterion may be used to determine how face detection and/or track will be assigned.

Operation 406 may be optional based on, for example, the strategy used for determining how to distribute the range of criterion in operation 402. In operation 406, a determination may be made as to whether it is necessary to rebalance the distribution that was originally determined in operation 402. This may be important in situations where the original distribution in operation 402 was based on balancing the processing load between the plurality of data processors. If in operation 406 a determination is made that rebalancing is required, then in operation 402 a new distribution may be determined. Otherwise, if in operation 406 it is determined that rebalancing is not required, then in optional operation 408 a certain threshold value may be assigned to at least one data processor in the plurality of data processors. For example, the certain threshold may be configured to cause the at least one data processor to delay detecting faces to a later received frame if further face detection in a received frame would cause a processing load of the at least one data processor to exceed the certain threshold. Optionally, operation 408 may be followed by a return to operation 400 to restart the operations for distributing face tracking and/or face detection responsibilities to the plurality of data processors.

While FIG. 4 illustrates various operations according to an embodiment, it is to be understood that not all of the operations depicted in FIG. 4 are necessary for other embodiments. Indeed, it is fully contemplated herein that in other embodiments of the present disclosure, the operations depicted in FIG. 4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Thus, the present disclosure is directed to a parallel face detection and tracking system. In general, embodiments consistent with the present disclosure may be configured to distribute the processing load associated with the detection and tracking of different faces in an image between multiple data processors. If needed, processing load balancing and/or protective features may be implemented to prevent the data processors from becoming overwhelmed. In one embodiment, a device may comprise, for example, a communication module and at least one processing module. The communication module may be configured to receive at least image information that may be processed by a plurality of data processors in the data processing module. For example, each of the data processors may be configured to detect faces in the image information and/or track detected faces in the image information based on at least one criterion.

The following examples pertain to further embodiments. In one example embodiment there is provided a device. The device may include a communication module configured to receive at least image information, and at least one processing module including a plurality of data processors, each of the plurality of data processors being configured to at least one of detect faces in the image information or track detected faces in the image information based on at least one criterion.

The above example device may be further configured, wherein the image information is a frame of video received from an image capture device. In this configuration the example device may further comprise a memory configured to store results information generated by each of the plurality of data processors, the results information including at least detected face size and the location of each detected face within the frame. In this configuration the example device may be further configured, wherein each of the plurality of data processors is further configured to delay detecting faces to a later received frame if further face detection in a received frame would cause a processing load of a data processor to exceed a certain threshold.

The above example device may be further configured, alone or in combination with the above example configurations, wherein the device further comprises a face detection and tracking allocation module configured to balance a face detection and tracking workload between the plurality of data processors based on the criteria.

The above example device may be further configured, alone or in combination with the above example configurations, wherein the at least one criterion is based on a detected face size scale. In this configuration the example device may be further configured, wherein the at least one criterion includes a range of detected face size scales.

The above example device may be further configured, alone or in combination with the above example configurations, wherein the processing module is a microprocessor and the plurality of data processors are processing cores within the microprocessor.

In another example embodiment there is provided a method. The method may include determining how to allocate at least one of detecting faces in image information or tracking detected faces in the image information between a plurality of data processors based on at least one criterion, and assigning at least one of detecting faces or tracking of detected faces between the plurality of data processors based on the determination of how to allocate.

The above example method may be further configured, wherein the determination of how to allocate comprises determining a range of the criterion based on a minimum of the criterion, a maximum of the criterion and an increment of the criterion, and distributing portions of the range of the criterion between the plurality of data processors. In this configuration the example method may be further configured, wherein the distribution of the portions of the range is a linear distribution resulting in each of the plurality of data processors receiving an equal-sized portion. In this configuration the example method may be further configured, wherein the distribution of the portions of the range is a distribution based on balancing processing load between the plurality of data processors. In this configuration, the example method may further comprise determining the processing load in each of the plurality of data processors, and rebalancing the distribution of the portions of the range based on the determination of the processing load in each of the plurality of data processors.

The above example method may be further configured, alone or in combination with the above further configurations, wherein the at least one criterion is based on detected face scale size.

The above example method may further comprise, alone or in combination with the above further configurations, assigning a certain threshold to at least one data processor in the plurality of data processors, the certain threshold being configured to cause the at least one data processor to delay detecting faces to a later received frame if further face detection in a received frame would cause a processing load of in the at least one data processor to exceed the certain threshold.

In another example embodiment there is provided a system comprising a device including at least a processing module, the system being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out any of the above example methods.

In another example embodiment there is provided a device configured for parallel face detection and tracking arranged to perform any of the above example methods.

In another example embodiment there is provided a device having means to perform any of the above example methods.

In another example embodiment there is provided a system comprising at least one machine-readable storage medium having stored thereon individually or in combination, instructions that when executed by one or more processors result in the system carrying out any of the above example methods.

In another example embodiment there is provided a device. The device may include a communication module configured to receive at least image information, and at least one processing module including a plurality of data processors, each of the plurality of data processors being configured to at least one of detect faces in the image information or track detected faces in the image information based on at least one criterion.

The above example device may be further configured, wherein the image information is a frame of video received from an image capture device, the device further comprising a memory configured to store results information generated by each of the plurality of data processors, the results information including at least detected face size and the location of each detected face within the frame. In this configuration, the example device may be further configured, wherein each of the plurality of data processors is further configured to delay detecting faces to a later received frame if further face detection in a received frame would cause a processing load of a data processor to exceed a certain threshold.

The above example device may be further configured, alone or in combination with the above example configurations, wherein the device further comprises a face detection and tracking allocation module configured to balance a face detection and tracking workload between the plurality of data processors based on the criteria.

The above example device may be further configured, alone or in combination with the above example configurations, wherein the at least one criterion is based on a detected face size scale or a range of detected face size scales.

The above example device may be further configured, alone or in combination with the above example configurations, wherein the processing module is a microprocessor and the plurality of data processors are processing cores within the microprocessor.

In another example embodiment there is provided a method. The method may include determining how to allocate at least one of detecting faces in image information or tracking detected faces in the image information between a plurality of data processors based on at least one criterion, and assigning at least one of detecting faces or tracking of detected faces between the plurality of data processors based on the determination of how to allocate.

The above example method may be further configured, wherein the determination of how to allocate comprises determining a range of the criterion based on a minimum of the criterion, a maximum of the criterion and an increment of the criterion, and distributing portions of the range of the criterion between the plurality of data processors. In this configuration the example method may be further configured, wherein the distribution of the portions of the range is a linear distribution resulting in each of the plurality of data processors receiving an equal-sized portion. In this configuration the example method may be further configured, wherein the distribution of the portions of the range is a distribution based on balancing processing load between the plurality of data processors. In this configuration, the example method may further comprise determining the processing load in each of the plurality of data processors, and rebalancing the distribution of the portions of the range based on the determination of the processing load in each of the plurality of data processors.

The above example method may further comprise, alone or in combination with the above further configurations, assigning a certain threshold to at least one data processor in the plurality of data processors, the certain threshold being configured to cause the at least one data processor to delay detecting faces to a later received frame if further face detection in a received frame would cause a processing load of in the at least one data processor to exceed the certain threshold.

In another example embodiment there is provided a system comprising a device including at least a processing module, the system being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry any of the above example methods.

In another example embodiment there is provided a device. The device may include a communication module configured to receive at least image information, and at least one processing module including a plurality of data processors, each of the plurality of data processors being configured to at least one of detect faces in the image information or track detected faces in the image information based on at least one criterion.

The above example device may be further configured, wherein the image information is a frame of video received from an image capture device. In this configuration the example device may further comprise a memory configured to store results information generated by each of the plurality of data processors, the results information including at least detected face size and the location of each detected face within the frame. In this configuration the example device may be further configured, wherein each of the plurality of data processors is further configured to delay detecting faces to a later received frame if further face detection in a received frame would cause a processing load of a data processor to exceed a certain threshold.

The above example device may be further configured, alone or in combination with the above example configurations, wherein the device further comprises a face detection and tracking allocation module configured to balance a face detection and tracking workload between the plurality of data processors based on the criteria.

The above example device may be further configured, alone or in combination with the above example configurations, wherein the at least one criterion is based on a detected face size scale. In this configuration the example device may be further configured, wherein the at least one criterion includes a range of detected face size scales.

The above example device may be further configured, alone or in combination with the above example configurations, wherein the processing module is a microprocessor and the plurality of data processors are processing cores within the microprocessor.

In another example embodiment there is provided a method. The method may include determining how to allocate at least one of detecting faces in image information or tracking detected faces in the image information between a plurality of data processors based on at least one criterion, and assigning at least one of detecting faces or tracking of detected faces between the plurality of data processors based on the determination of how to allocate.

The above example method may be further configured, wherein the determination of how to allocate comprises determining a range of the criterion based on a minimum of the criterion, a maximum of the criterion and an increment of the criterion, and distributing portions of the range of the criterion between the plurality of data processors. In this configuration the example method may be further configured, wherein the distribution of the portions of the range is a linear distribution resulting in each of the plurality of data processors receiving an equal-sized portion. In this configuration the example method may be further configured, wherein the distribution of the portions of the range is a distribution based on balancing processing load between the plurality of data processors. In this configuration, the example method may further comprise determining the processing load in each of the plurality of data processors, and rebalancing the distribution of the portions of the range based on the determination of the processing load in each of the plurality of data processors.

The above example method may be further configured, alone or in combination with the above further configurations, wherein the at least one criterion is based on detected face scale size.

The above example method may further comprise, alone or in combination with the above further configurations, assigning a certain threshold to at least one data processor in the plurality of data processors, the certain threshold being configured to cause the at least one data processor to delay detecting faces to a later received frame if further face detection in a received frame would cause a processing load of in the at least one data processor to exceed the certain threshold.

In another example embodiment there is provided a system. The system may include means for determining how to allocate at least one of detecting faces in image information or tracking detected faces in the image information between a plurality of data processors based on at least one criterion, and means for assigning at least one of detecting faces or tracking of detected faces between the plurality of data processors based on the determination of how to allocate.

The above example system may be further configured, wherein the determination of how to allocate comprises means for determining a range of the criterion based on a minimum of the criterion, a maximum of the criterion and an increment of the criterion, and means for distributing portions of the range of the criterion between the plurality of data processors. In this configuration the example system may be further configured, wherein the distribution of the portions of the range is a linear distribution resulting in each of the plurality of data processors receiving an equal-sized portion. In this configuration the example system may be further configured, wherein the distribution of the portions of the range is a distribution based on balancing processing load between the plurality of data processors. In this configuration the example system may further comprise means for determining the processing load in each of the plurality of data processors, and means for rebalancing the distribution of the portions of the range based on the determination of the processing load in each of the plurality of data processors.

The above example system may be further configured, alone or in combination with the above further configurations, wherein the at least one criterion is based on detected face scale size.

The above example system may further comprise, alone or in combination with the above further configurations means for assigning a certain threshold to at least one data processor in the plurality of data processors, the certain threshold being configured to cause the at least one data processor to delay detecting faces to a later received frame if further face detection in a received frame would cause a processing load of in the at least one data processor to exceed the certain threshold.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    a communication module configured to receive image information;
    at least one processing module including a plurality of data processors, each of the plurality of data processors being configured to perform at least one of a face detection workload or face tracking workload on the image information based at least in part on a plurality of face size scales; and
    a face detection and tracking allocation module configured to:
        determine said plurality of face size scales, wherein each of said plurality of face size scales corresponds at least in part to a size of at least one detected face in a plurality of detected faces in said image information, relative to a size of another detected face of said plurality of detected faces; and
        balance performance of said face detection workload and said face tracking workload among the plurality of data processors at least in part by assigning different data processors of said plurality of data processors to different face size scales.

2. The device of claim 1, wherein the image information is a frame of video received from an image capture device.

3. The device of claim 2, further comprising a memory configured to store results information generated by each of the plurality of data processors, the results information including at least a detected face size and the location of each detected face within the frame.

4. The device of claim 2, wherein each of the plurality of data processors is further configured to delay performance of said face detection workload to a later received frame if performance of said face detection workload on a received frame would cause a processing load of a data processor to exceed a threshold.

5. The device of claim 1, wherein said face detection and tracking module is further to:
    allocate performance of said face detection workload or said face tracking workload associated with relatively more process intensive face size scales to at least one first data processor of said plurality of data processors, and to allocate performance of said face detection workload or said face tracking workload associated with relatively less process intensive face size scales to at least one second data processor of said plurality of data processors; and
    balance a face detection and tracking workload between the plurality of data processors such that relatively fewer face scales are allocated to said at least one first data processor, and relatively more face size scales are allocated to said at least one second data processor.

6. The device of claim 1, wherein the face detection and tracking allocation module is further to dynamically reallocate performance of said face detection workload and said face tracking workload among said plurality of data processors based at least one part on said one or more face size scales.

7. The device of claim 1, wherein the processing module is a microprocessor and the plurality of data processors are processing cores within the microprocessor.

8. A method, comprising:
    determining a plurality of face size scales, wherein each face size scale corresponds at least in part to a size of one or more detected face in a plurality of detected faces in image information, relative to a size of another detected face of said plurality of detected faces;
    determining how to allocate performance of at least one of face detection workload or face tracking workload on said image information among a plurality of data processors based at least in part on said plurality of face size scales; and
    based on said determination, allocating performance of at least one of said face detection workload and said face tracking workload among the plurality of data processors at least in part by assigning different data processors of said plurality of processors to different face size scales.

9. The method of claim 8, wherein said determining how to allocate comprises determining said plurality of face size scales based at least in part on a maximum face size scale, a minimum face size scale, and a face size scale increment.

10. The method of claim 9, wherein:
    said allocating comprises assigning performance of said face detection workload or said face tracking workload associated with a distribution of said plurality of face size scales to each of said plurality of data processors; and
    said distribution is a linear distribution, such that each of the plurality of data processors receives an equal sized portion of said plurality of face size scales.

11. The method of claim 9, wherein:
    said allocating comprises assigning performance of said face detection workload or said face tracking workload associated with a distribution of said plurality of face size scales to each of said plurality of data processors; and
    said distribution is configured to balance a processing load among the plurality of data processors.

12. The method of claim 11, further comprising:
    determining the processing load in each of the plurality of data processors; and
    rebalancing the assignment of the performance of said face detection workload or said face tracking workload associated with said plurality of face size scales based on the determination of the processing load in each of the plurality of data processors.

13. The method of claim 8, wherein:
said allocating comprises assigning performance of said face detection workload or said face tracking workload associated with relatively more process intensive face scales to at least one first data processor of said plurality of data processors, and assigning performance of said face detection workload or said face tracking workload associated with relatively less process intensive face scales to at least one second data processor of said plurality of data processors; and
said allocating further comprises balancing at least one of said face detection workload and said face tracking workload among the plurality of data processors such that relatively fewer face scales are allocating to said at least one first data processor and relatively more face scales are allocating to said at least one second data processor.

14. The method of claim 8, further comprising:
assigning a threshold to at least one data processor of the plurality of data processors, the threshold being configured to cause the at least one data processor to delay performance of said face detection workload to a later received frame if performance of said face detection workload on a received frame would cause a processing load of in the at least one data processor to exceed the threshold.

15. At least one non-transitory machine-readable storage medium having stored thereon, individually or in combination, instructions that when executed by one or more processors result in the following operations comprising:
determining a plurality of face size scales, wherein each face size scale corresponds at least in part to a size of at least one detected face of a plurality of detected faces in image information, relative to a size of another detected face of said plurality of detected faces;
determining how to allocate performance of at least one of face detection workload or face tracking workload on said image information among a plurality of data processors based at least in part on said plurality of face size scales; and
based on said determination, allocating performance of at least one of said face detection workload and said face tracking workload among the plurality of data processors at least in part by assigning different data processors of said plurality of data processors to different face size scales.

16. The medium of claim 15, wherein said determining how to allocate comprises determining said plurality of face size scales based at least in part on a maximum face size scale, a minimum face size scale, and a face size scale increment.

17. The medium of claim 16, wherein:
said allocating comprises assigning performance of said face detection workload or said face tracking workload associated with a distribution of said plurality of face size scales to each of said plurality of data processors; and
said distribution is a linear distribution, such that each of the plurality of data processors receives an equal sized portion of said plurality of face size scales.

18. The medium of claim 16, wherein:
said allocating comprises assigning performance of said face detection workload or said face tracking workload associated with a distribution of said plurality of face size scales to each of said plurality of data processors; and
said distribution is configured to balance a processing load among the plurality of data processors.

19. The medium of claim 18, further comprising instructions that when executed by one or more processors result in the following operations comprising:
determining the processing load in each of the plurality of data processors; and
rebalancing the assignment of said face detection workload or said face tracking workload associated with said plurality of face size scales based on the determination of the processing load in each of the plurality of data processors.

20. The medium of claim 15, wherein:
said allocating comprises assigning performance of said face detection workload or said face tracking workload associated with relatively more process intensive face scales to at least one first data processor of said plurality of data processors, and allocating performance of said face detection workload or said face tracking workload associated with relatively less process intensive face scales to at least one second data processor of said plurality of data processors; and
said allocating further comprises balancing at least one of said face detection workload and said face tracking workload among the plurality of data processors such that relatively fewer face scales are allocating to said at least one first data processor and relatively more face scales are allocating to said at least one second data processor.

21. The medium of claim 15, further comprising instructions that when executed by one or more processors result in the following operations comprising:
assigning a threshold to at least one data processor of the plurality of data processors, the threshold being configured to cause the at least one data processor to delay performance of said face detection workload to a later received frame if performance of said face detection workload on a received frame would cause a processing load of in the at least one data processor to exceed the threshold.

* * * * *